(12) United States Patent
Nikodym et al.

(10) Patent No.: US 6,723,954 B2
(45) Date of Patent: Apr. 20, 2004

(54) STRAIGHT POLARITY METAL CORED WIRE

(75) Inventors: Anthony Nikodym, Troy, OH (US); Steven Barhorst, Sidney, OH (US)

(73) Assignee: Hobart Brothers Company, Troy, OH (US)

( * ) Notice: Subject to any disclaimer, the term of this patent is extended or adjusted under 35 U.S.C. 154(b) by 0 days.

(21) Appl. No.: 09/683,584

(22) Filed: Jan. 22, 2002

(65) Prior Publication Data

US 2003/0136774 A1 Jul. 24, 2003

(51) Int. Cl.$^7$ ............................................. B23K 15/00
(52) U.S. Cl. ................................. 219/130.1; 219/121.11
(58) Field of Search .................... 219/130.1, 121.11, 219/137 WM, 146.21, 146.23, 146.24, 146.41, 146.51

(56) References Cited

U.S. PATENT DOCUMENTS 4,463,243 A * 7/1984 Chruch ........................ 219/74
4,800,131 A * 1/1989 Marshall et al. ............. 428/558

OTHER PUBLICATIONS

ITW Hobart Brothers New Product News, Jan. 2001, 3 pgs.
Agusa, K., et al., "*MIG welding with pure argon shielding—arc stabilisation by rare earth additions to electrode wires,*" Metal Construction, Sep., 1981, pp. 570–574.

Dilthey, Prof. Dr.–Ing. Ulrich, et al., "*Metal–arc active gas welding in the high power range with flux–cored wire electrodes.*" Welding & Cutting, Mar., 1996, pp. E47–E49.

Lenivkin, V.A., et al., "*Increasing The Arc Stability in Consumable Electrode Welding with Straight Polarity Current In Shielding Gases,*" Svarochnoe Proizvodstvo., 1981, No. 12, pp. 28–30.

Varukha, E.N., et al., "*Conditions of formation of spray transfer of metal in welding with straight polarity current,*" Svarochnoe Proizvodstvo 1986, 33(d) 39–41.

* cited by examiner

Primary Examiner—M. Alexandra Elve
(74) Attorney, Agent, or Firm—Houston Eliseeva LLP

(57) ABSTRACT

A core composition of a metal-cored wire comprising a combination of graphite and potassium compounds has been proven to stabilize the arc in a straight polarity welding configuration. In particular, adding a combination of graphite and potassium manganese titanate ($K_2MnTiO_4$) and potassium sulfate ($K_2SO_4$) in the preferred combination of graphite and potassium compounds from the range of about 0.3% to about 5.0% wt resulted in a greatly stabilized arc, reduced spatter and reduced warpage while maintaining high deposition rates of the DCEN welding process.

14 Claims, 4 Drawing Sheets

DCEN

DCEN

DCEP

STRAIGHT POLARITY METAL CORED WIRE

BACKGROUND OF INVENTION

The present invention relates in general to the field of gas metal arc welding and electrodes for gas metal arc welding. More specifically, the present invention relates to a straight polarity (DCEN) welding configuration and a metal-cored wire electrode having a composition functioning as an arc stabilizer.

Gas metal arc welding (GMAW) is a welding process in which an electrical arc between a filler metal and a work piece heats the filler metal and the work and welds them together. The filler metal is usually a consumable electrode which is fed into the process as fast as it is consumed. The electrical arc is formed between the tip of the consumable electrode and the metal of the work piece. The GMAW welding process can be used to join two pieces of sheet metal together, as well as in many other applications. An example of a welding gun and an arrangement for GMAW is schematically shown in FIG. 1. A consumable welding electrode 14 is fed into the welding process through a welding gun 10. Electrode 14 is melted by an electrical arc 18 established between the electrode and the work piece consisting of metal sheets 11 and 13. Externally supplied gas, such as Ar, $CO_2$ or mixtures thereof, enters the welding process through a gas nozzle 12 in welding gun 10 and shields the arc, the tip of the electrode and the pool of molten metal 15 by forming a gas shield 16. The advantages of the GMAW process is the high quality weld that can be produced faster and with very little spatter and loss of alloying elements due to the gas shield and a stable electrical arc.

The consumable electrode in FIG. 1, which is melted by the electrical arc, is transported by the arc to the work piece to serve as a filler metal. The arc produces the heat for the welding process and is maintained by the electron flow from a cathode (positive terminal) and an anode (negative terminal). In the GMAW context both the consumable electrode and the work piece can function as a cathode or an anode. In a straight polarity configuration the electrode is negative and the work piece is positive, which configuration is called direct current electrode negative (DCEN). In a reverse polarity configuration the electrode is positive and the work piece is negative, which configuration is called direct current electrode positive (DCEP). In a schematic illustration of a DCEP configuration in FIG. 2(a) the electron flow is directed from a negatively charged work piece to a positively charged electrode, while the flow of positively charged ionized particles of the shielding gas flows to the negatively charged work piece, bombarding it and adding to the overall heating of the work piece and causing deep penetration of the weld into the work piece. In a schematic illustration of a DCEN configuration shown in FIG. 2(b) the electron flow is directed from a negatively charged electrode to a positively charged work piece, while the flow of the ionized shielding gas flows from the work piece to the electrode. Therefore, in the DCEN configuration the heat flow is directed away from the work piece toward the electrode, resulting in a higher electrode melting rate and a lesser heating of the work piece.

The GMAW process normally uses a direct current electrode positive (DCEP) configuration, which produces a stable arc and low spatter In GMAW applications the direct current electrode negative (DCEN) configuration results in a non-stable erratic arc, sputter, produces poor quality weld, and, therefore it is rarely used.

Nevertheless, it is quite attractive to try to use the DCEN configuration for various welding applications where the lower amount of heat supplied to the work piece and shallower penetration would be advantageous. One of the examples of such advantageous applications is gas metal arc welding of thin sheets of metal. The excessive heat flow from the electrode to the metal in the DCEP configuration burns through a thin sheet metal and severely damages the work piece. The DCEN welding process also allows to perform the welding with lower or more controlled penetration into the base material, as well as limit the dilution and warpage of the material while maintaining high deposition rates. If the problem of stabilizing the arc during the DCEN welding process could be successfully solved, then the high quality weld and high deposition rates could be obtained in a controlled straight polarity welding applications.

One of the ways to stabilize the arc of the GMAW process is to alter the composition of the wire electrode to add fluxing and alloying elements which function as arc stabilizers. Conventional solid electrode wires are not stable in DCEN welding process and produce a large amount of spatter that must be removed after the welding. In addition, the arc in the solid wire welding process is erratic and hard to control. Carbon steel metal cored wires for GMAW are flux-cored wires used as electrodes comprising a flux filler core encapsulated by a metal sheath. The core of the wire electrode is made of fluxing and alloying compounds, which core becomes a deposited weld material. The composition of the core determines the composition and physical characteristics of the weld metal. Generally, the compounds contained in the core are selected to function as deoxidizers, alloying elements, arc stabilizers and may provide additional shielding gas. Metal cored wires provide the ability to add various materials to the core, influencing the welding characteristics and conditions in a way that overcomes traditional flaws of the DCEN process. Therefore, it would be desirable to have an electrode wire with a core composition allowing to maintain the stability of the arc in a straight polarity welding process while exhibiting the desired high deposition and fast fill characteristics.

SUMMARY OF INVENTION

The present invention also provides a welding process with a stable arc in a straight polarity configuration. The welding process comprises a wire electrode, a welding machine and a welding gun having means for feeding an electrode into the welding gun. The electrode comprises a sheath encapsulating a core having a core composition comprising a combination of graphite and one or more compounds of potassium. The combination of graphite and compounds of potassium in the core composition does not exceed approximately 5% by weight. A power source supplying electrical current to the electrode is also provided.

The present invention also provides a straight polarity welding process having a stable arc and providing high deposition rates and good quality weld while reducing the spatter of molten metal and warpage of the work piece.

The present invention provides a metal-cored wire having a core composition functioning as an arc stabilizer. The core composition of the present invention composition comprises a combination of graphite and one or more compounds of potassium, wherein the combination does not exceed approximately 5% by weight.

The invention also provides a method of manufacturing a novel metal-cored wire electrode having a core composition comprising a combination of graphite and one or more compounds of potassium. The advantageous combination of graphite and potassium compounds comprises potassium manganese titanate ($K_2MnTiO_4$) and potassium sulfate ($K_2SO_4$) and falls within the range from about 0.3% to about 5.0% wt.

These and other features and advantages of the present invention will become more fully apparent upon consideration of the following detailed description of the invention with the accompanying drawings.

DETAILED DESCRIPTION

The metal-cored wire of the present invention is a wire used in GMAW DCEN welding process with a recommended shielding gas comprising Ar and $CO_2$ or a mixture thereof. The preferred combination of the mixture of Ar and $CO_2$ comprises a minimum of 75% and a maximum of 95% of Ar.

The wire of the present invention was developed based on the preferred composition of METALLOY X-CEL™, available from Illinois Tool Works Inc., the assignee of the present invention, conforming to the AWS specification AWS E70C-6M H4 per AWS A5.18, and ASME SFA 5.18. This wire exhibits high deposition rates (about 30–40% higher than solid wire electrodes), high travel speeds (about 30–40% higher than solid wire electrodes) and is well suited for semi-automatic, automatic and robotic welding on mild steel. The preferred thickness of the steel sheets is about 6.5 mm or less. The typical undiluted weld metal chemistry of such wire is shown in Table 1.

TABLE 1

| | C | Mn | Si | P | S |
|---|---|---|---|---|---|
| DCEN, 75% Ar/25% $CO_2$ | 0.06 | 1.28 | 0.65 | 0.011 | 0.011 |
| DCEN, 90% Ar/10% $CO_2$ | 0.06 | 1.35 | 0.70 | 0.011 | 0.010 |

Figure 1:
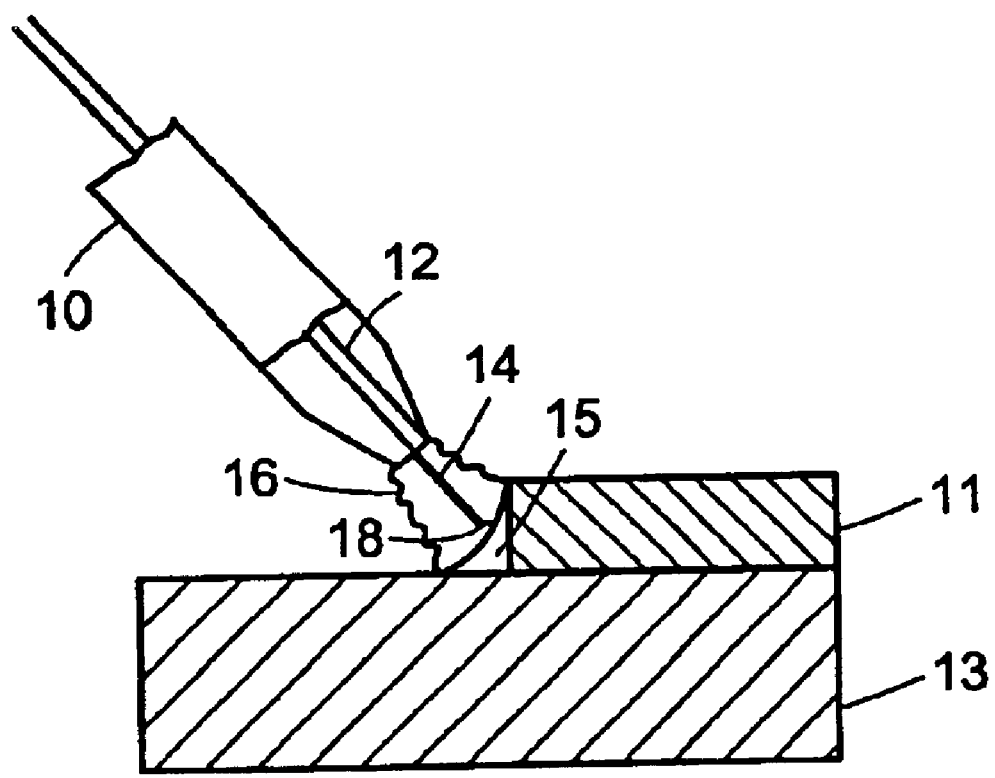
FIG. 1 is a schematic illustration of a welding gun nozzle and a work piece.
Figure 2B:
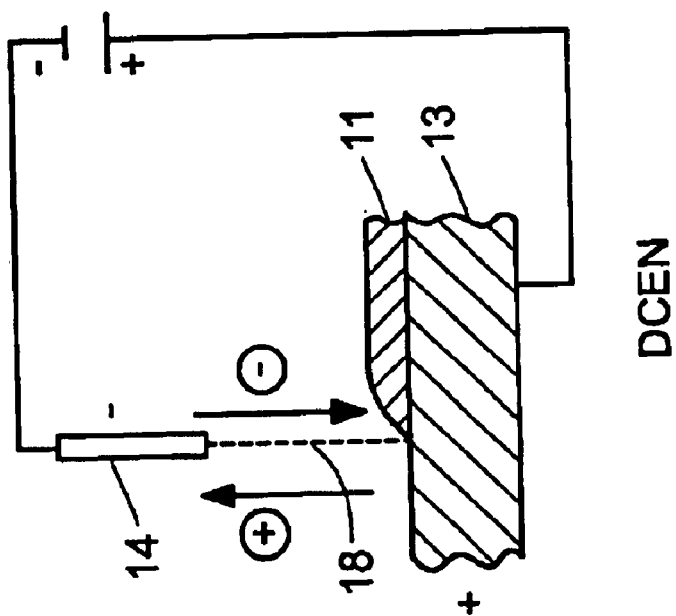
FIGS. 2(a)–(b) are schematic illustrations of the DCEP and DCEN welding configurations.
Figure 2A:
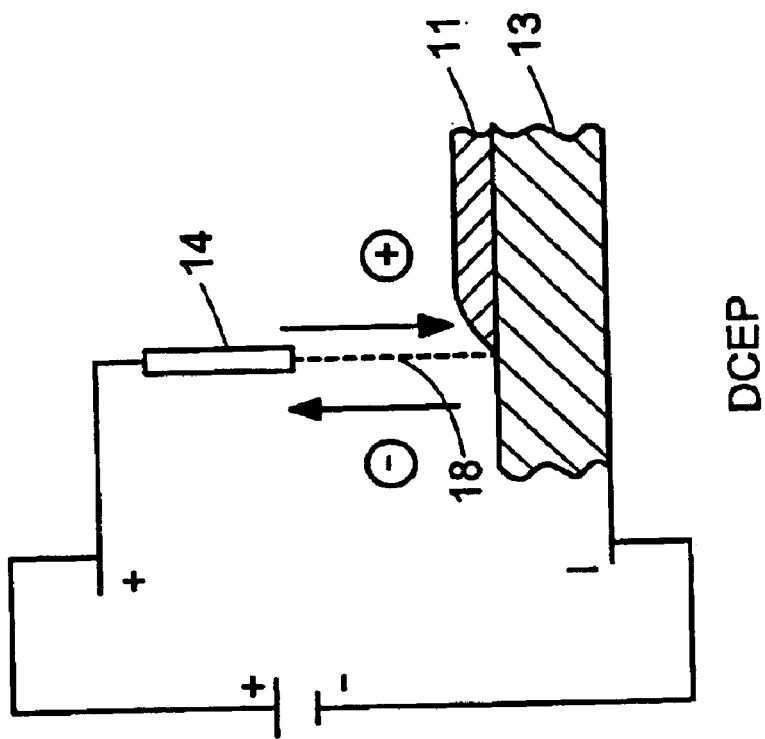
Figure 3:
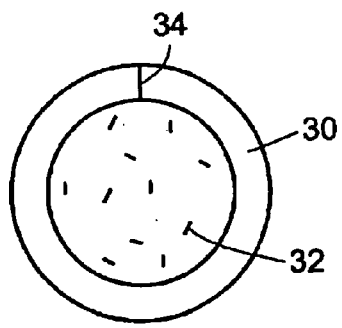
FIG. 3 is a cross sectional view of the metal-cored wire of the present invention.

As shown in FIG. 3, the wire of the present invention comprises a sheath 30 encapsulating a core of the wire 32. Core 32 is usually made of a compacted powder and has a preselected chemical composition. For the purposes of the present invention, the core composition comprises a combination of graphite and one or more compounds of potassium. It is contemplated by the present invention that the graphite and compounds of potassium can be present in the core homogeneously or heterogeneously in the form of clusters, strands or other suitable configuration. The total percentage of the combination of graphite and potassium compound(s) does not exceed approximately 5% wt, with the preferred total percentage of graphite and potassium compound(s) selected from the range of about 0.3% to about 5.0%. It has also been established that either additions of graphite alone or one or more potassium compounds alone increased the stability of the arc in the straight polarity welding configuration only slightly, compared to the stability of the arc for conventional metal-cored electrodes or solid wires used in the same straight polarity configuration. However, the addition of the combination of graphite and one or more compounds of potassium has dramatically increased the stability of the arc in the straight polarity welding process. In particular, the addition of the preferred potassium compounds, such as potassium manganese titanate ($K_2MnTiO_4$) and potassium sulfate ($K_2SO_4$), has contributed to the described effect of stabilizing the arc particularly advantageously. The most effective arc stabilizing range of the core composition for the preferred potassium compounds ($K_2MnTiO_4$ and $K_2SO_4$) and graphite was the combination selected from the range of about 0.3% wt to about 5.0% wt.

The process of manufacturing the metal-cored wire of the present invention involves a series of steps in which a strip (or a sheath material) is fed through the shaping dies which bend the strip and shape it into a shape that later can be filled with the ingredients of the core composition. Usually, the shape is a U-shape. The shaped sheath is then filled with the core composition, which, according to the present invention, comprises a combination of graphite and one or more compounds of potassium up to 5% wt. As described above, the preferred compounds of potassium are potassium manganese titanate ($K_2MnTiO_4$) and potassium sulfate ($K_2SO_4$) in a combined total selected from the range of about 0.3% to about 5.0% wt. The wire then travels through the closing dies which close it into a tubular form, causing the sheath to encapsulate the core and forming a metal-cored wire with a seam 34, as shown in FIG. 3. The core composition usually comprises powdered ingredients that are fed into the sheath. The powder is compacted when the closed wire is fed through the drawing dies to reduce the wire's diameter to the final size and compress the core.

Figure 4:
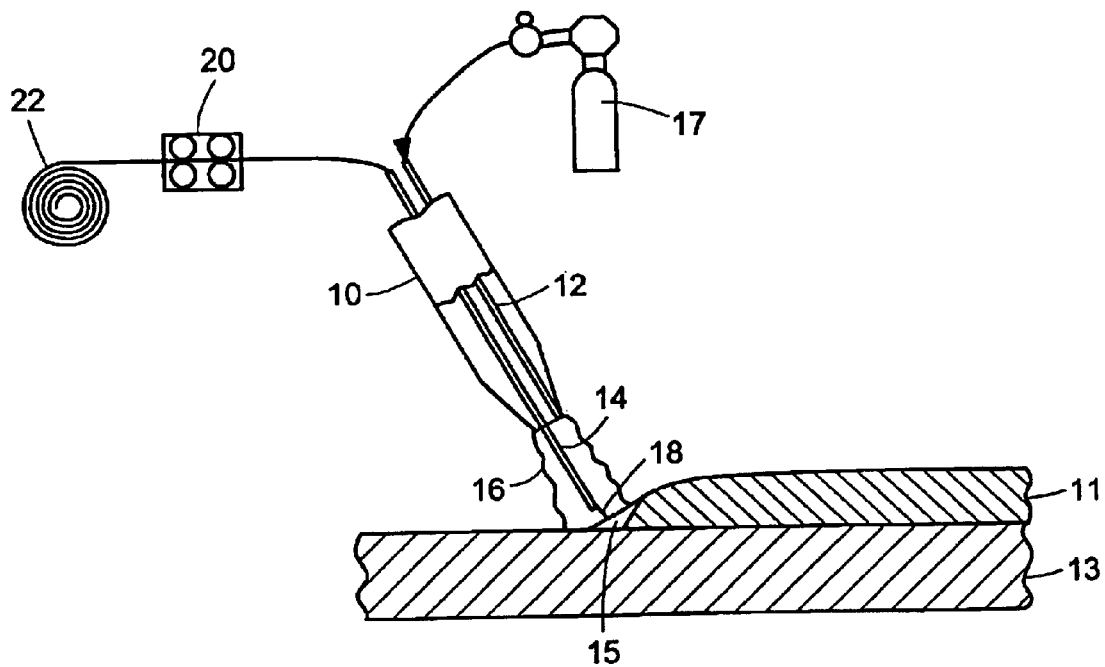
FIG. 4 is a schematic illustration of a welding apparatus with a wire electrode of the present invention.

A welding apparatus for straight polarity welding utilizing the present invention exhibits great arc stability and improves the overall quality of the weld. An illustrative example of the welding apparatus in accordance with the present invention is provided in FIG. 4. The welding apparatus comprises a welding gun 10 with electrode 14 and means for feeding the electrode into the welding gun. An example of the means for feeding the electrode shown in FIG. 4 is a wire drive 20 and a wire reel 22. It should be understood, of course, that any other way of feeding the wire electrode into the welding gun falls within the scope and spirit of the present invention. A shielding gas is supplied to the welding process through gas nozzle 12 in the welding gun. Electrode 14 has a sheath and a core having a core composition comprising a combination of graphite and one or more compounds of potassium, the combination of graphite and compounds of potassium in the core composition not exceeding approximately 5% by weight. The preferred potassium compounds comprise potassium manganese titanate ($K_2MnTiO_4$) and potassium sulfate ($K_2SO_4$), and the preferred combination of graphite and potassium compounds is selected from the range of about 0.3% to about 5.0%. For the gas metal arc welding process in which the welding gun is coupled to a power supply in a straight polarity configuration, the preferred shielding gas is a mixture of Ar and $CO_2$ mixed in the 75% Ar/25% $CO_2$ or 90%Ar/10% $CO_2$ proportions. Arc 18 formed between the wire electrode of the present invention and the work piece (sheets 11 and 13 in FIG. 4) exhibits great stability, high depositions rates, reduced spatter of the molten electrode and reduced warpage of the weld. The shielding gas can be supplied to the welding process from an external source 17, as shown in FIG. 4.

To form a weld on a work piece using the welding apparatus with a novel metal-cored wire electrode of the present invention, a welding process uses a welding apparatus with means for feeding the wire electrode and means for supplying a shielding gas into the apparatus. The means for feeding the wire into the welding apparatus can comprise a wire drive and a wire reel, or any other suitable arrangement supplying the wire into the apparatus with the speed sufficient to replace the portion of the wire consumed during the welding process. It is contemplated that the means for feeding the wire into the welding apparatus can be internal or be located outside of the apparatus. The welding apparatus is coupled to a power supply in a straight polarity configuration and the arc is formed between the electrode and the work piece on which the weld is to be formed. Supplying the shielding gas into the welding process can be done from an external gas supply feeding the gas into a gas nozzle of the welding apparatus.

Feeding the wire electrode of the present invention into the welding apparatus involves providing the wire with a sheath and a core having a core composition with a combination of graphite and one or more compounds of potassium not exceeding approximately 5% by weight. As described above, the preferred compounds of potassium are potassium manganese titanate ($K_2MnTiO_4$) and potassium sulfate ($K_2SO_4$) and the preferred combination of graphite and potassium compounds is selected from the range of about 0.3% to about 5.0% wt. The preferred mixture of shielding gas is a mixture of Ar and $CO_2$ mixed in the 75% Ar/25% $CO_2$ or 90% Ar/10% $CO_2$ proportions. The above-described welding process is preferably used in the gas-metal arc welding process.

Figure 5:
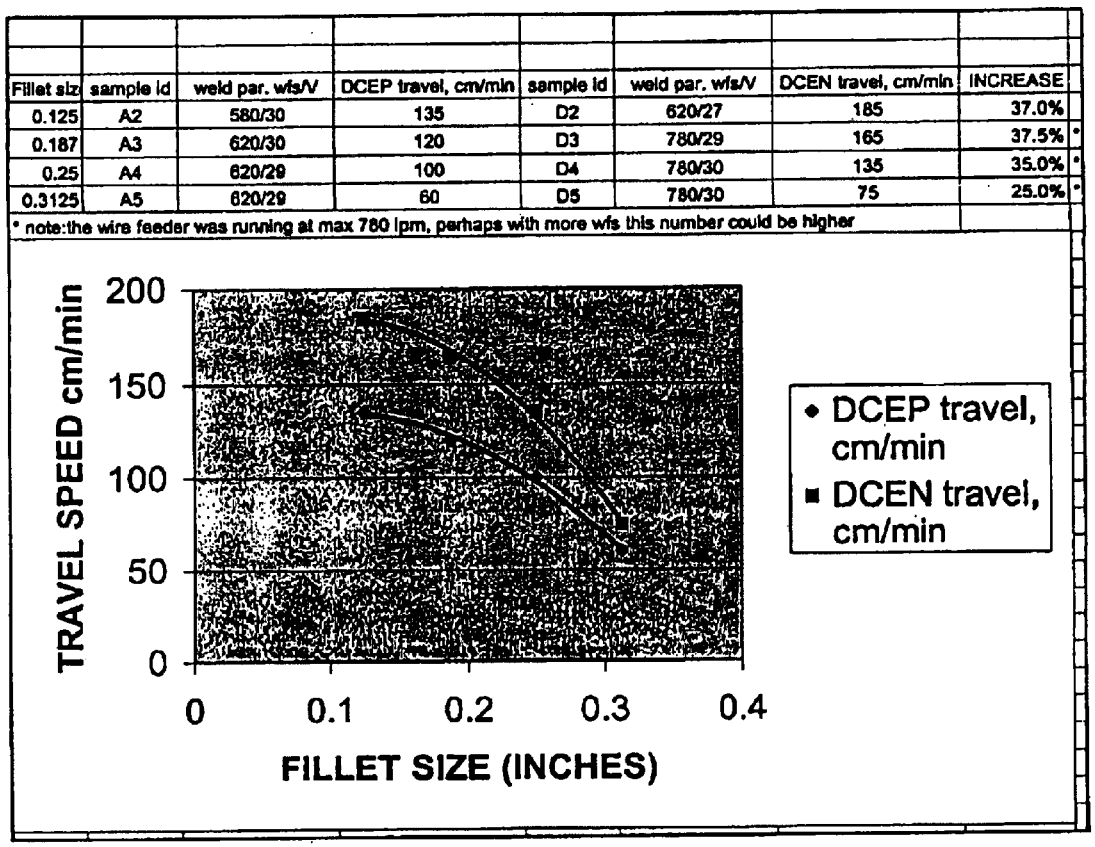
FIG. 5 is a graph illustrating an increase in travel speed for the DCEN configuration.

Experimental data of FIG. 5 illustrate the advantages of the welding process in the DCEN configuration for the wires having the compositions of the present invention. For different fillet sizes ranging from about 0.125 inches to about 0.3125 inches the increase of the travels speed in the DCEN configuration was from about 25% to about 37.5% compared to the travel speeds of the DCEP configuration.

It has been therefore demonstrated that adding a combination of graphite and potassium compounds to the core of a metal-cored wire stabilizes the arc in a straight polarity welding configuration. In particular, it has been demonstrated that adding a combination of graphite and potassium manganese titanate ($K_2MnTiO_4$) and potassium sulfate ($K_2SO_4$) in the preferred combination of graphite and potassium compounds from the range of about 0.3% to about 5.0% wt greatly the stability of the arc. The written description of the invention enables one skilled in the art to make and use what is at present considered to be the best mode of the invention, and it should be appreciated and understood by those skilled in the art that the existence of variations, combinations, modifications and equivalents falls within the spirit and scope of the specific exemplary embodiments disclosed herein. It is also to be understood that the illustrative examples described herein are not to be construed as limiting the present invention in any way. The objects, features and advantages of the present invention as claimed in the appended claims are applicable to all types of metal core wires, such as low carbon metal core, stainless steel metal core and low alloy metal core wires.

What is claimed is:

1. A welding apparatus for a welding process in a straight polarity configuration comprising:
    a welding gun having means for feeding an electrode into the welding gun; and
    the electrode comprising a sheath encapsulating a core having a core composition, the core composition comprising a combination of graphite and one or more compounds of potassium, the combination of graphite and compounds of potassium in the core composition not exceeding approximately 5% by weight, wherein the welding apparatus is adapted to couple to a power source of direct electrical current in a straight polarity (DCEN) configuration.

2. The welding apparatus of claim 1, further comprising a gas source for supplying a shielding gas to the welding apparatus.

3. The welding apparatus of claim 1, wherein the welding process is gas metal arc welding.

4. The welding apparatus of claim 1, wherein the means for feeding the electrode into the welding gun comprise a wire drive and a wire reel.

5. The welding apparatus of claim 1, wherein one or more compounds of potassium comprise $K_2MnTiO_4$ and $K_2SO_4$.

6. The welding apparatus of claim 5, wherein the combination is selected from the range from about 0.3% to about 5.0%.

7. The welding apparatus of claim 2, wherein the shielding gas comprises a mixture of Ar and $CO_2$.

8. A welding process in a straight polarity configuration comprising:
    providing a welding apparatus having means for feeding an electrode into the welding apparatus and means for supplying a shielding gas into the welding apparatus;
    coupling the welding apparatus to a power source of direct electrical current in the straight polarity configuration (DCEN) and forming an arc;
    feeding the electrode into the welding apparatus, the electrode comprising a sheath and a core having a core composition, the core composition comprising a combination of graphite and one or more compounds of potassium, the combination of graphite and compounds of potassium in the core composition not exceeding approximately 5% by weight; and
    supplying the shielding gas into the welding apparatus to shield the electrode and the arc.

9. The welding process of claim 8, wherein supplying the shielding gas into the welding apparatus comprises providing an external gas source.

10. The welding process of claim 8, wherein feeding the electrode into the welding apparatus comprises providing means for feeding the electrode that is external to the welding apparatus.

11. The welding process of claim 8, wherein supplying the shielding gas comprises providing a mixture of Ar and $CO_2$.

12. The welding process of claim 8, wherein the welding process is a gas metal arc welding process.

13. The welding process of claim 8, wherein one or more compounds of potassium comprise $K_2MnTiO_4$ and $K_2SO_4$.

14. The welding process of claim 13, wherein the combination is selected from the range from about 0.3% to about 5.0%.

* * * * *